United States Patent [19]

Fennesz

[11] Patent Number: 4,646,814
[45] Date of Patent: Mar. 3, 1987

[54] SYSTEM FOR TEMPERING A ROOM

[76] Inventor: Manfred Fennesz, Damböckgasse 4, A-1060 Wien, Austria

[21] Appl. No.: 629,783
[22] PCT Filed: Nov. 18, 1983
[86] PCT No.: PCT/EP83/00306
    § 371 Date: Jul. 10, 1984
    § 102(e) Date: Jul. 10, 1984
[87] PCT Pub. No.: WO84/01993
    PCT Pub. Date: May 24, 1984

[30] Foreign Application Priority Data

Nov. 18, 1982 [AT] Austria .............................. 4215/82
Aug. 26, 1983 [CH] Switzerland ........................ 4666/83

[51] Int. Cl.⁴ ...................... F24H 9/06; F24D 3/00; F24D 5/00
[52] U.S. Cl. .......................................... 165/56; 237/69
[58] Field of Search ................ 237/69; 165/49, 56, 165/53, 54, 47 R

[56] References Cited

U.S. PATENT DOCUMENTS 2,226,061 12/1940 Kershaw ............................. 237/69
4,109,859  8/1978 Durst ................................. 237/69

FOREIGN PATENT DOCUMENTS 46339  11/1980 Japan ................................... 237/69
266038  1/1950 Sweden ................................ 237/69

Primary Examiner—Henry Bennett
Attorney, Agent, or Firm—Marmorek, Guttman & Rubenstein

[57] ABSTRACT

A system for tempering a room is accommodated in a closure of said room, preferably in the floor. On the side of the closure facing away from the room an insulating plate (103) is located, which possibly has projections (18) arranged in the direction of the room. On the side facing the room a wall or floor covering (6) is foreseen. In the interspace between the insulating plate (103) and the outer layer (6), possibly between the projections (18), air can be circulated and a heating and/or cooling line (1) extends, said heating and/or cooling line being at least partially in connection with a thermal conductive sheet (17). The total surface of the thermal conductive sheet (17) exposed to the air flow is about twice as large at the surface of the thermal conductive sheet (17) which directly envelopes or contacts the line (1) and which is exposed to the air flow. The interspace is especially defined by a box section (17, 102) consisting preferably of several parts, of which one as a thermal conductive sheet (17) partially envelopes the line (1).

11 Claims, 23 Drawing Figures

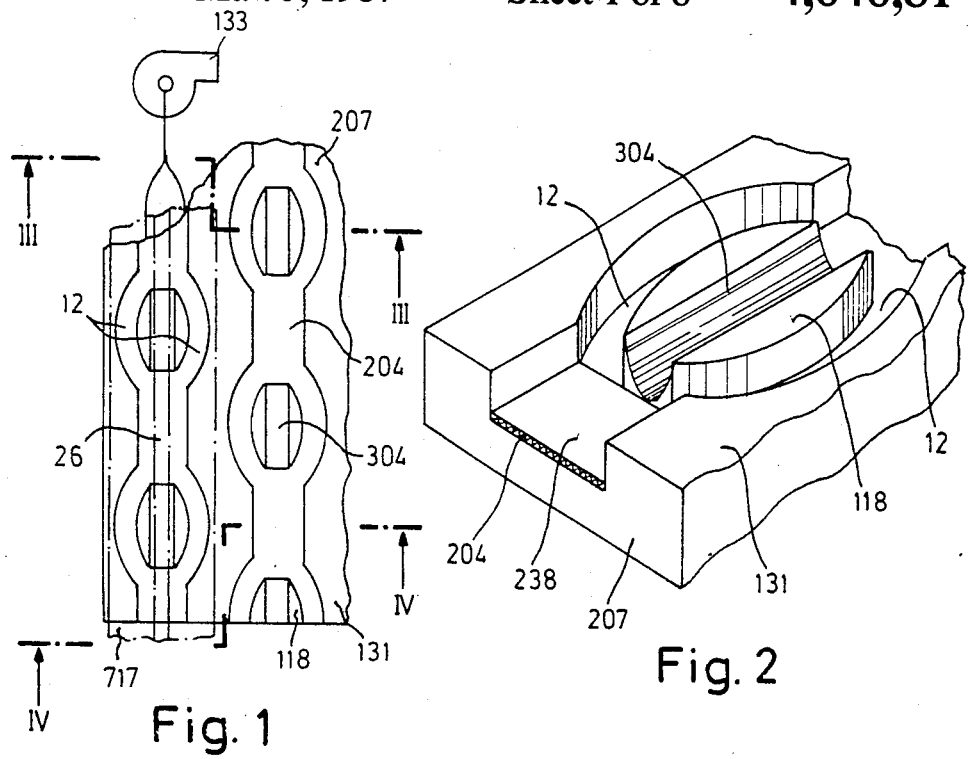
Fig. 1
Fig. 2
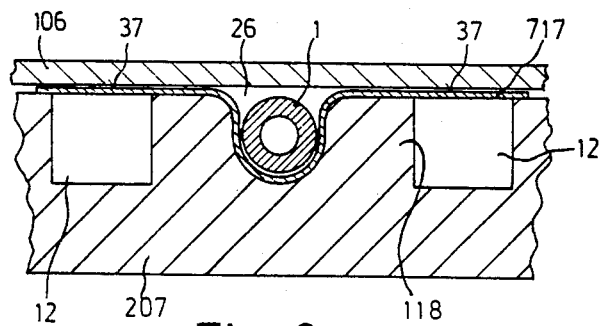
Fig. 3
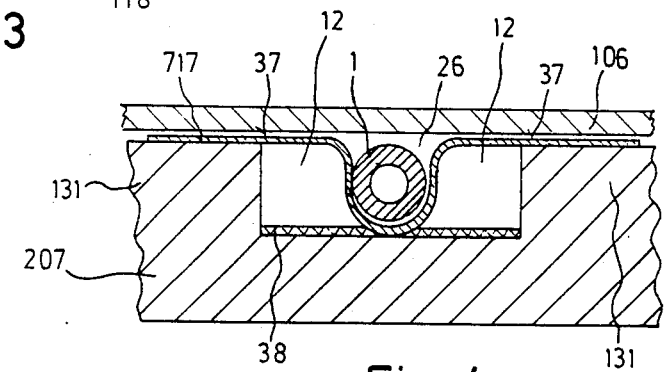
Fig. 4

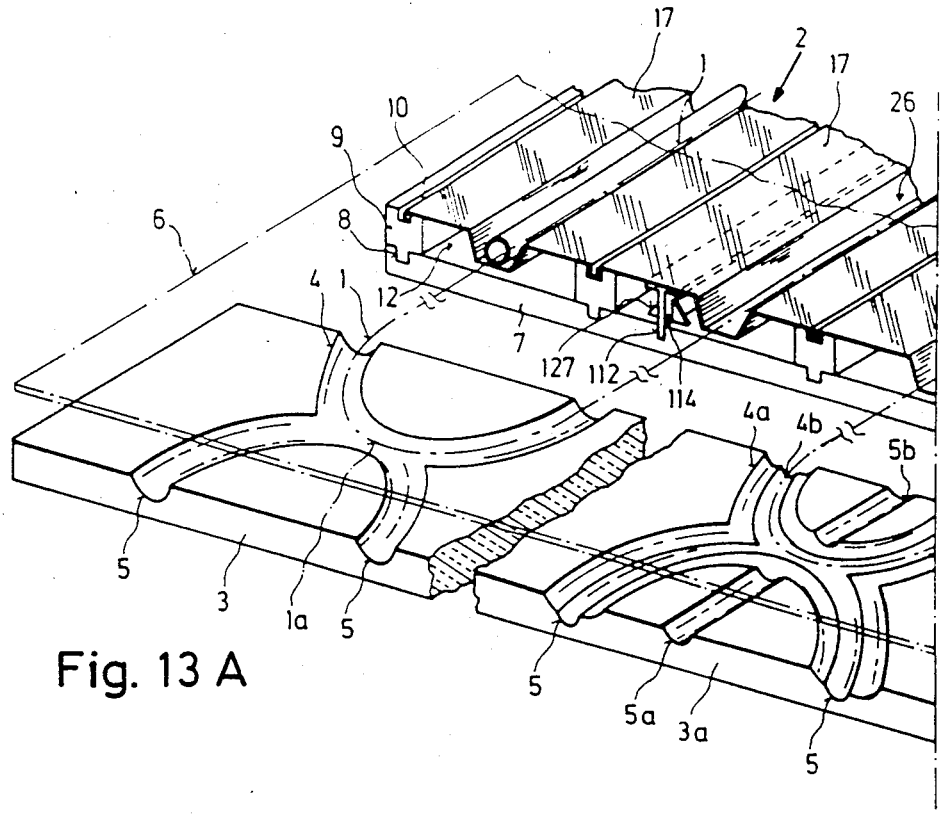
Fig. 13 A
Fig. 13 B
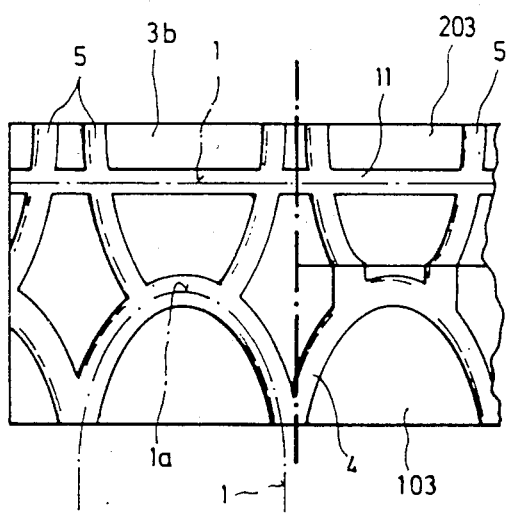

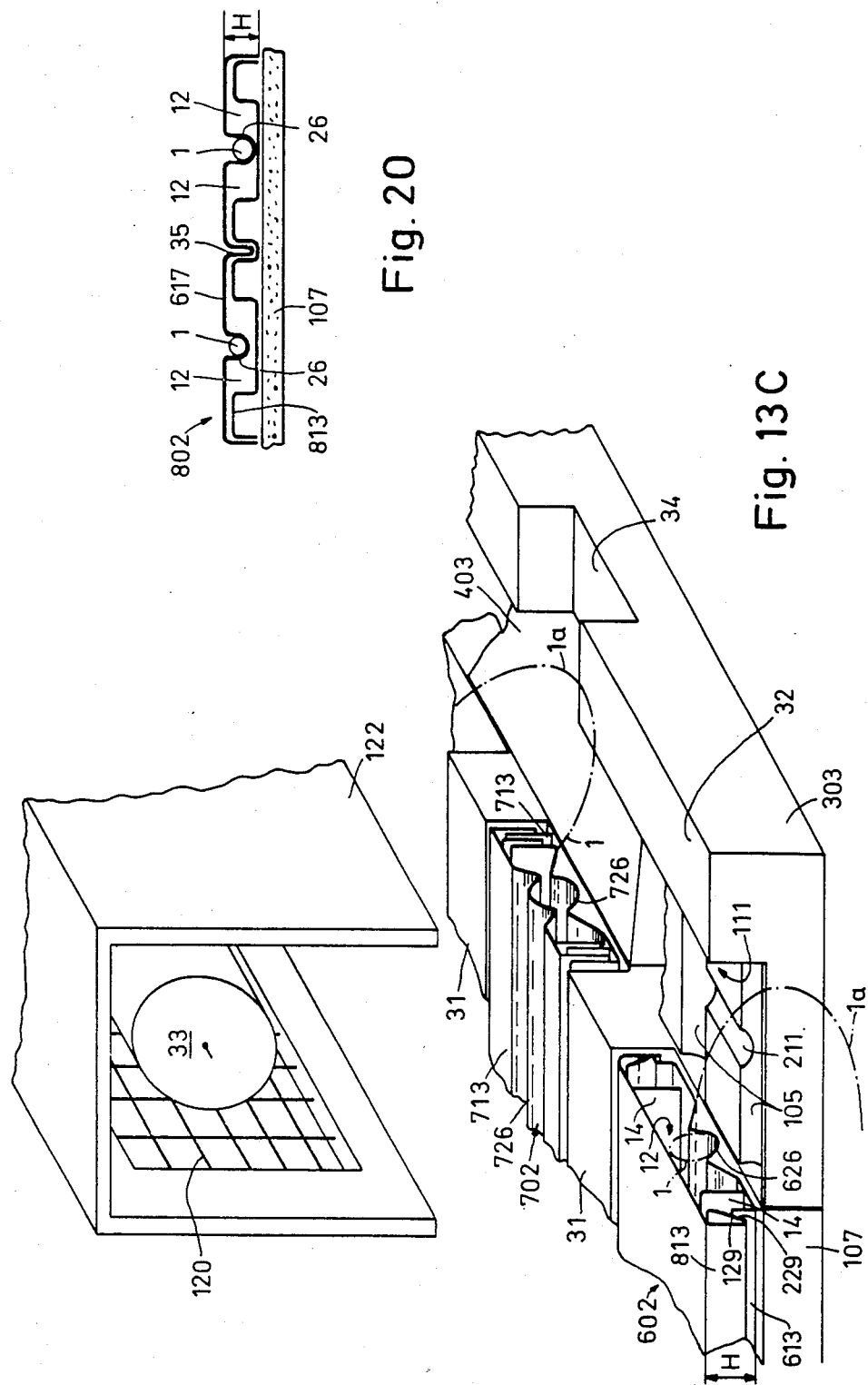

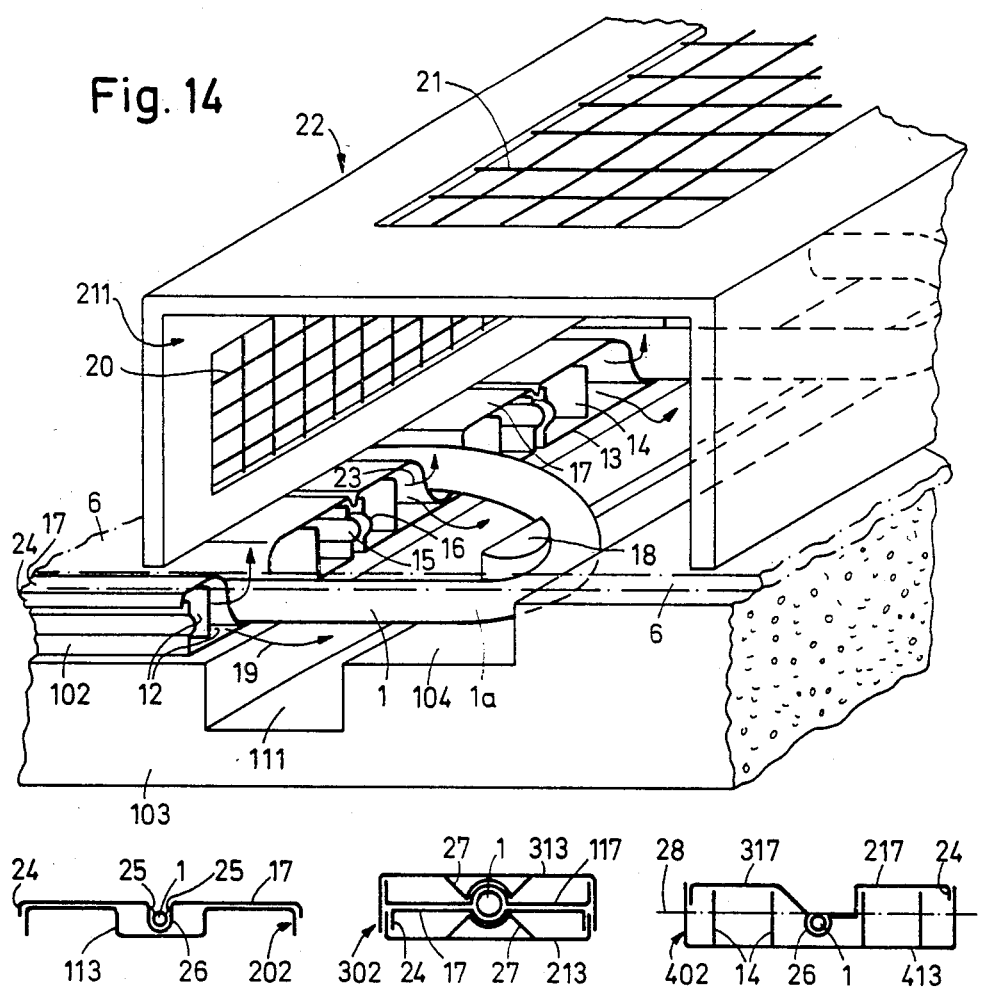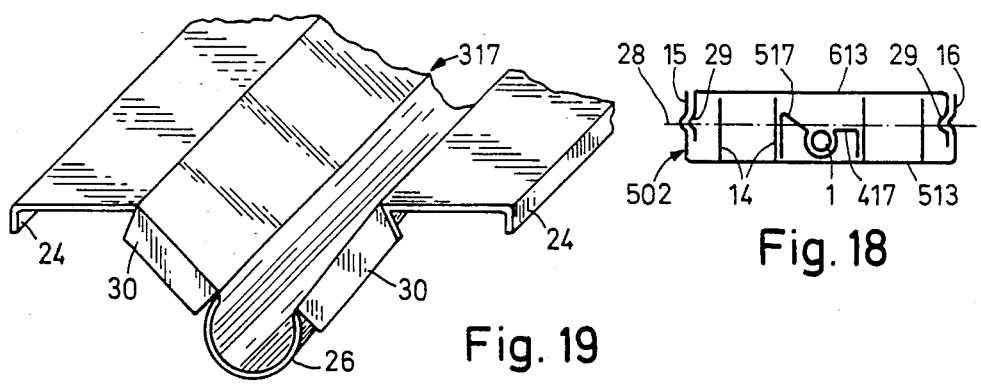

SYSTEM FOR TEMPERING A ROOM

FIELD OF THE INVENTION

The invention relates to a system for tempering a room which is installed in a closure of the room, preferably in the floor, where on the side of the closure looking away from said room an inner layer, especially an insulating plate, which possibly has projections to be arranged in the direction of the room, is foreseen, on which a wall of floor covering is foreseen on the side facing the room, and where in the interspace between the inner layer and the outer layer, possibly between the projections, air can be circulated and a heating and/or cooling line extends, said line being at least partially connected with a thermal conductive sheet.

It is noted here fundamentally that the invention relates to the heating, as well as to the cooling of a room, and that it can be installed not only in the floor, but also in one or more of the walls or in the ceiling.

BACKGROUND OF THE INVENTION

Previously, the recesses for accommodating the line foreseen between the projections were constructed withsuch a height that air could be circulated over or under the line. This required on the one hand holding devices of special construction for the line, and on the other hand the height of the tempering system between the inner layer and the outer layer usually had to be twice as long as the diameter of the line.

In addition, it was previously assumed that the essential task of a thermal conductive sheet is to transport the heat or the cold from the line to the surface of the construction, and to immediately distribute it over a larger surface. In the scope of the present invention it was established that in the performance of this task only a modest portion of the heat can be transported, namely by conduction, so that the temperature difference between the line and the surface of the closure is to be sure reduced, but that it is still too high. This leads to heat accumulation, and hence to the necessity of operating with, e.g. in the case of warm-water floor heating, a higher supply temperature. This circumstance reduces the economy of the heating system to a state which is lower than if the supply temperature could be lowered further.

SUMMARY OF THE INVENTION

It is the objective of the invention to improve a tempering system of the aforementioned type with regard to its economy, and to decrease the possible heat losses by improving the distribution and utilization of the heat such that the supply temperature can possibly be lowered.

According to a further objective a further improvement is to be achieved on the one hand by avoiding heat energy losses in the direction leading away from the room and by good aerodynamic direction of the aforementioned air flow into the room, and on the other hand by reducing the structural height, by which measure for the one part the heat transfer routes are shortened, and for the other part installation is afforded where it has previously been impossible due to the restricted spatial conditions.

According to the present invention this objective is reached by the distance between the inner layer and the outer layer preferably being essentially equal to or only slightly deviating from the height of the line measured in the direction of the wall thickness, and by the total surface of the thermal conductive sheet being about twice as large as the surface of the thermal conductive sheet directly enveloping the line being exposed to the air blow.

Surprisingly, by these measures a synergetic effect is achieved: For the one part the structural height of the tempering system can be kept to a minimum; for the other part either no or very much simpler holding devices are also necessary for the line. However, by the low structural height the problem is encountered that the air can no longer pass over or underneath the line, but that it must pass around the line, whereby the heat transfer (which is also favored by the low structural height), is also impeded, for which reason according to the further characteristics of the invetion an, "underfloor convector" is created, the given area ratio having shown to be preferred as the minimum dimension on the basis of tests.

These measures result in an overall substantially improved heat removal, namely in addition to by heat conduction also by convection, so that the system can be operated at low supply temperatures which were previously considered to be impossible, and the economy of the heating and/or cooling system is enhanced enormously. In many cases is sufficient to circulate the air in the ducts only internally — either by natural convection or by forced circulation — to improve the heat removal from the heating and/or cooling line and therewith the temperature distribution over the closure of the room; it is however even more expedient to blow the heated air into the room in a manner which is as such known.

However, if one speaks of the "outside dimension of the line", in general its outside diameter is meant because generally the line will have a circular or at least oval cross-section. In spite of the advantage of being able to use conventional, commercially available pipes or heating cable with circular cross-section, other cross-sections such as square, or flat, rectangular can naturally even be preferred due to the favorable surface area/volume ratio since the heat emission can thereby be improved.

In general the thermal conductive sheet will have full surface contact with the line, but all cases are conceivable in which it can be expedient for the thermal conductive sheet to envelope the line only at certain points.

The system is preferably configured such that the limitation of the interspace is given at least partially by a box section of rectangular cross-section, with which the heating line has a thermally conductive connection, the larger cross-sectional dimension of the box section extending parallel to the closure to be heated, and a layer of thermally insulating material being foreseen on its side looking away from the room, and at least one heating line being accommodated inside the structural height of the box section.

The previous constructions were based on the assumption that the heating line would have to be accommodated in a duct of larger cross-section to enable air circulation. This has often led to relatively large structural heights which could not be accommodated everywhere.

A construction with a box section has also already become known where the heating line had a thermally conductive connection (via metal web plates). However, the heating line was arranged relatively far outside the box section, so that on the one hand heat transfer could only be effected via the relatively thin web plates and the heat losses to the side looking away from the room were relatively high, and on the other hand the structural height corresponded to the height of the box section, plus the cross-section of the heating line and a distance given by the web plates. By the embodiment according to the present invention the structural height is conversely reduced for practical purposes to the height of the heating line, or in the case of several heating lines arranged one above the other to the height of these heating lines, and hence to at least half the heights of previous systems.

In addition, the heat transfer to the duct or ducts adjacent to the heating line, and hence also the efficiency, is also thereby improved. Finally, installation can also be simplified because the panel-like box sections can be prefabricated together with the installed heating line, and at the construction site only the connection must then be made.

It is to be sure preferred for the box section accommodating the heating line in its interior to consist entirely of thermally conductive material, especially of aluminium, whereby especially the manufacture, handling and installation is facilitated. On the other hand a insulation, e.g. and insulating plate, is normally foreseen thereunder, which can possibly be foregone if on the side looking away from the room the box section itself consists of another, especially an insulating material than on the side facing the room, on which side the box section can consist of a thermally conductive and/or heat retaining material.

Not only in this case, but also for other reasons has it proven to be expedient for certain application for the box section to consist of several parts which can be assembled, e.g. of a lower and an upper part which can be taken apart and put together. As will be shown later the lower part and the upper part can consist of the same, expediently of a thermally conductive and/or heat-retaining material, possibly even for simplification of manufacture of similar construction and then assembled together as e.g. matching identical pairs; on the other hand it suffices for only the upper part to consist of a thermally conductive sheet which can be placed on the lower part and envelopes the heating line at least partially. The lower part can then consist of plastic or another insulating material.

It is also especially expedient for several box sections arranged adjacent to one another to be joined to one another by means of an arrangement which can form e.g. a positive connection and can consist of bucklings, bulgings or the like on the respective longer narrow side of the box section. The joining arrangement can simultaneously form the joining fixture for a corresponding shaped upper part.

To achieve the given surface area ratio on the thermal conductive sheet and to circulate the air essentially obstruction-free next to the line enveloped by the thermal conductive sheet it is preferred that in addition to the duct accommodating the line and limited by the thermal conductive sheet at least one further air duct which has a thermally conductive connection with the thermal conductive sheet and through which circulated air is flowing, possibly also connected with the duct accommodating the line, is foreseen, said air duct preferably being connected with the room to be tempered. if the thermal conductive sheet extends over the entire length of the line, its recess accommodating the line forms the one duct. On the outside of this recess at least one further duct can however be foreseen as an air duct, which either only provides for uniform distribution of the heat inside the closure of the room, or is also connected with the room, in which latter case a blower is expediently connected with the air duct. In any case, due to the fact that a separate duct is assigned for the air circulation, the heat transport is highly favored. The thermal conductive sheet can however also be interrupted, so that the interior of its recess accommodating the line is connected with the air duct.

However, isofar as the line lies in a groove which extends at an angle to an air duct, it has proven to be expedient for the cross section of this duct to be enlarged at that point at which it is intersected by the line, since after the installation of the system a part of this cross-sectional area is occupied by the line extending transversely. The duct floor can thus e.g. exhibit a trough. After the installation the free cross-section available for the air circulation is nearly constant over the length of the air duct. The trough under the overcrossing line in the duct floor which consists mostly of an insulating material does reduce the insulating effect at this point, but only so slightly that this reduction can be tolerated. Since as will be shown later a heating line of serpentine configuration usually forms bend zones toward the limiting ends of the closure to be heated, but occasionally also with the installation of several heating registers in the middle of a closure, the problem is encountered that the air from the duct spaces between the heating line sections connected by a bend zone can only be extracted out of or blown into the room if special measures are taken because otherwise it would be trapped between a possibly insulating baseplate and a outer layer if any .

The simplest solution to this problem is surely covering the bend zones, insofar as they extend along the wall, with an intake or an outlet grating. Another possibility is offered by the provision of a collective duct of larger cross-section than the heating line, whereas this collective duct can be located beneath the bend zone, or the bend zone of the heating line is bent into the collective duct extending inside the baseplate, so that the air can pass over this zone on the side facing the room to be heated.

Just in that case when a free space, namely an air duct is foreseen to the side of a line especially when the system according to the present invention is being installed the danger of slipping exists, so that attention must repeatedly be paid to correct positioning of the line, which causes a waste of time. For this reason, and for reasons of improved load disribution, it is advantageous according to a further embodiment of the invention for at least one holding device to be foreseen for the line enveloped by the thermal conductive sheet and extending next to an air duct, and for a projection —which is preferably nearly lentile-shaped as viewed from above — to be arranged in a duct with a groove for accommodating the line, while an air duct is foreseen on at least one side of the projection, The projection can be formed of the insulating plate or mounted on it, or it can consist of heat-retaining material. The preferred lentile-shaped configuration provides a streamlined shape for the flow in the air duct.

It has already been mentioned that a type of "underfloor convector" is created by the invention. This designation is all the more justified in the case that the thermal conductive sheet enveloping the line is fitted with at least one rib, preferably at that point where the heated air discharges into the room, to achieve the surface area ratio of the thermal conductive sheet mentioned above, said rib preferably extending up to the next closure and especially in a plane transverse to the plane of the insulating plate or of the outer layer. Namely, by the extension of the rib to the next closure it assumes an additional function and also supports the thermal conductive sheet mechanically against this closure. This can be done to secure the position of the heat conductive sheet in a relatively wide duct of the insulating plate or — if it extends in a plane transverse to the plane of the insulating plate — to increase the strength of the thermal conductive sheet in the case of that room closure in which it is installed being loaded, especially where walking strength is required, i.e. floors.

The "underfloor convector" thus created provides high heat emission at that point where it is especially desired, e.g. in the case of floor heating under the windows, thereby inducing natural convection through the air ducts, whereby under circumstances a fan or a blower which is otherwise necessary or advantageous to circulate the air can be omitted.

Such a system is also especially suited for cooling; in this case the warm air first "falls" on the convector, where it is cooled and precipitates its moisture as condensation water, which can easily be collected in a pan underneath the convector and removed. Problems of condensation water forming in the ducts are thereby avoided.

According to a further embodiment of the invention the hollow interior of the line can be connected to an air circulation blower, as well as to a heat exchanger, the line having preferably at least one opening discharging into the room, possibly at least one perforation hole discharging into an air duct. The heat exchanger serves either to heat up or to cool down the air which is blown through. The heat or the cold is given off to the thermal conductive sheet and is thereby uniformly distributed over the closure of the room. If it has already been mentioned that is it advantageous to circulate the air in the air duct by force using a blower, this is especially the case if air also directly constitutes the heat transport medium, so that the blower then performs a dual function (heat transport and air circulation). This dual function comes especially to bear when the hollow interior of the line has a connection with the room itself. If this connection is effected via an air duct, this constitutes a further measure for improved distribution of the heat inside the closure of the room. This system is also especially well suited for cooling because the condensate water can be collected and removed in the same manner as described above.

By repeated internal recirculation of the air its temperature approaches that of the line very closely and thereby distributes the heat even better. However, this means that in the case of a heating system the supply temperature of the line is very low, and in the case of cooling can be held relatively high.

Further details ensue from the following description of embodiments shown schematically in the drawing.

FIGS. 1 to 4 illustrate a first embodiment, FIG. 1 being a plan view, FIG. 2 a perspective view of the insulating plate used and FIGS. 3 and 4 sections through line III—III and line IV—IV respectively of FIG. 1.

With FIGS. 5 to 8 a further embodiment is elaborated, FIG. 5 analogusly being a plan view, FIG. 6 a perspective view of the insulating plate, while FIGS. 7 and 8 show sections through the lines VII—VII and VIII—VIII respectively of FIG. 5.

FIG. 9 illustrates another embodiment prior to or during the installation of the line, for which in FIGS. 10 and 11 a modification is shown in plan view and in cross section along the line XI—XI of FIG. 10.

FIG. 12 illustrates a modification of FIG. 4 to achieve an especially low structural height, and FIG. 13 shows in perspective view a further embodiment.

FIG. 13A shows a box section-like construction, together with two embodiments of attentent, prefabricated plates arranged against the edge of the heating line installation or of the room, of which FIG. 13B illustrates two further embodiments.

FIG. 13C is a perspective cutaway drawing of another embodiment. Further,

FIG. 14 shows the construction in the area of the bend zone of the heating and/or cooling line according to a further modification.

FIGS. 15 to 18 show various versions of the cross-sectional form of the box sections accommodating the heating and/or cooling line which are especially of metal, such as aluminium, two embodiments being illustrated with the left and the right side of FIGS. 17 and 18.

FIG. 19 shows an axonometric view of a thermal conductive sheet for installation of the heating line in one of the embodiments corresponding to the left side of FIG. 17, and FIG. 20 shows a further modification in addition to those described by FIGS. 15 to 18.

BRIEF DESCRIPTION OF THE DRAWING

With the embodiment according to the FIGS. 1 to 4 a plate 207 is foreseen, which can consist of thermally insulating or heat-retaining material. Against the room to be tempered (in the present case especially the room to be cooled) an outer layer 106 is foreseen (FIGS. 3, 4), which can consist of a heat conducting or heat retaining plate, of plaster or the like. A duct-like, partitioned hollow space 204 to accommodate a cooling line 1, possibly also a heating line, is foreseen between the insulating plate 207 and the outer layer 106. Line 1 can be connected to a heat exchanger which according to season and desired room temperature is used for heating or cooling. For this purpose line 1 is constructed as a hollow tube with a circular cross-section for conveying a fluid heat transporting medium. Other cross-sectional shapes are however naturally also possible.

A thermal conductive sheet 717 with a recess 26 accommodating the line 1 is arranged between the outer layer 106 and the insulating plate 207. The thermal conductive sheet therefore obtains its heat or cold from the line 1, with which it has a direct thermally conductive connection, and distributes it over a larger area. Depending on the temperature gradient or on the "supply temperature", i.e. the temperature supplied via the line 1, the wings 37 of the thermal conductive sheet extending horizontally in FIGS. 3 and 4 accept the supplied temperature and emit it to the environment. One can assume that starting from an imagined middle line through the recess 26 extending to the side edges of the two wings 37 the temperature curve corresponds nearly to an e function. As is known such an e function curve exhibits a steep and a flatter branch, which are connected together by a gentle transition.

Figure 5:
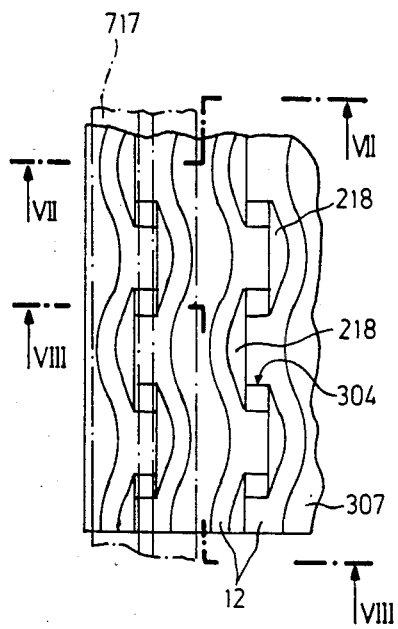
Figure 6:
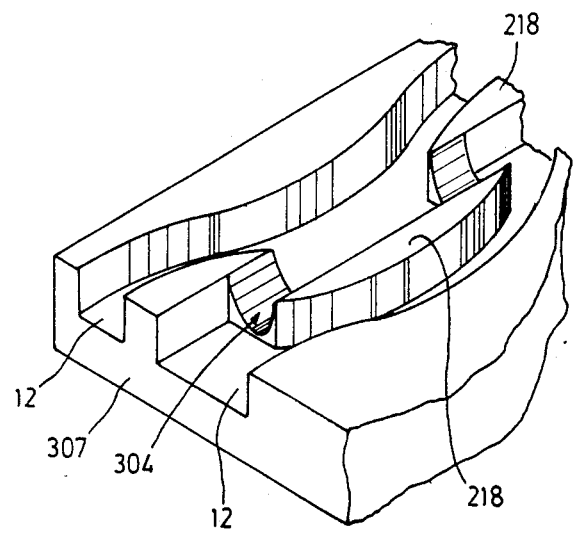
Figure 7:
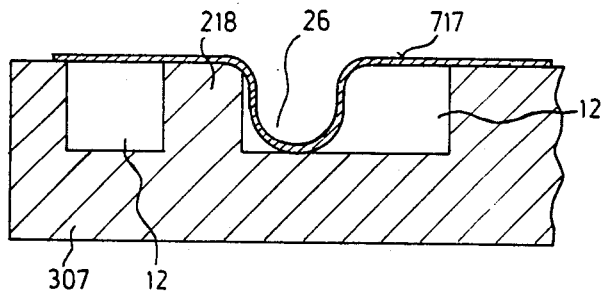
Figure 8:
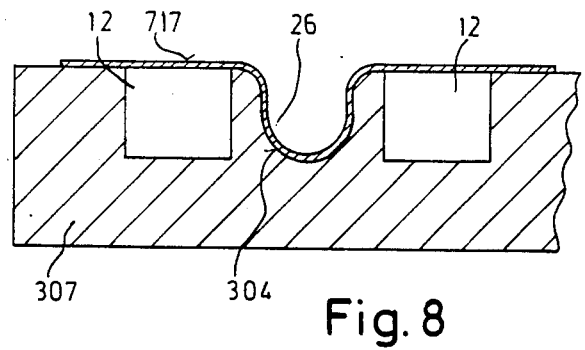

It was now established that the steeper branch (in which range the heat transfer proceeds more quickly and efficiently) can be exploited best if say the surface of the thermal conductive sheet 717 which is wholly exposed to the air flow, is preferably at least twice as large as the surface area of the thermal conductive sheet which directly envelopes the line 1. i.e. essentially the area of the recess 26, the cross-section of which has a circular arc shape.

The heating lines 1 which are usually installed parallel next to one another in a room closure extend in adjacently located thermal conductive sheets 717. These sheets can either overlap to avoid interruption, or for bridging a strip of thermally conductive e.g. aluminium plate (not shown) can be placed over the two wings 37 of two neighboring thermal conductive sheets 717. The heat transfer of such overlapping can be improved by the connection thereof by means of a thermally conductive compound (e.g. enamel).

As can be seen from FIGS. 2 and 4 a thermal conductive sheet 38, 238 can also be arranged on the floor of the duct 204 and 12 which conducts the heat away from the heating line 1 away even better and offers the air flowing through the duct 12 more surface area for the heat transfer. Such thermally conductive parts 38 can also have a supporting effect as will be shown later using FIG. 13 in the form of the ribs 214, 314 and 414.

The insulating plate 207 is furnished with projections 118, 131 (FIGS. 1, 2) which leave a hollow space 204 between them free to accommodate the line 1 and the thermal conductive sheet 717. This hollow space 204 is dimensioned relatively wide so that when the system is installed the line 1 with the thermal conductive sheet 717 inside the hollow space 204 would as such not have a secured position. For this reason the projections 188 furnished with grooves 304 are foreseen as braces inside the hollow space 204 in predetermined intervals. The grooves 304 are arranged such that the line 1 takes up the position about in the middle of the hollow space 204 as shown in FIGS. 3 and 4. This hollow space 204 is therefore divided into three channels, of which one channel accommodating the line 1 is formed by the recess 26 of the thermal conductive sheet 717 itself, while on the outside of the thermal conductive sheet 714 on both sides of the line 1 an air duct 12 is formed. In this way the condition can easily be met that the total surface area of the thermal conductive sheet 717 which is exposed to the air flow is at least twice as large as the circular arc area (seen in the cross-sectional view) which directly envelopes the line 1 and the outside of which is exposed to the air flow.

Here, the FIGS. 1, 2 and 3 illustrate that in the area of the projections 118 the air ducts 12 are diverted. To avoid a great increase in the air resistance every projection receives an essentially streamlined or lentil-shaped form. Both air ducts 12 (possibly also the interior of the recess 26) are expediently connected to a blower or a fan 133, as insinuated in FIG. 1. With this blower 133 the heat or cold removed from the outside of the thermal conductive sheet 717 can be blown directly into the room to be tempered. In the case of space cooling the system depicted can be installed in the ceiling, from where the cooled air falls uniformly to the floor. However, such installation also depends on the given possibilities.

According to FIG. 1 the intake side of the blower is connected to the air ducts 12. It can however also possibly be the discharge side which is connected to the air ducts 12. Which side of the blower 133 is selected is also dependent upon where the greater quantity of settling dust is to be expected. Especially in large cities the room is generally subjected to greater dust loading and should therefore (as opposed to the illustration of FIG. 1) be connected to the intake side to prevent raising the dust. In the line run a dust separator, i.e. which is generally a dust filter, can be foreseen to also provide for a cleaning effect.

The embodiment according to the FIGS. 5–8 is similar to the one which has been described above and differs essentially only by the type and form of the duct routing, and consequently also of the projections. This embodiment permits the parallel lines 1 to be installed somewhat closer together. While with the embodiment according to FIGS. 1 to 4 the thermal conductive sheet 717 is completely enveloped inside the grooves 304 of the projections 118 by insulating material, and hence prevented at these points from transferring the heat, in the case of the FIGS. 5 to 8 the lentile-shaped projections 218 are split and staggered such that at those points at which there is a projection 218 on the one side, on the other side of the air duct 12 the thermal conductive sheet is exposed to the air flow (cf. especially FIGS. 6, 7). From FIG. 5 it can however be seen that to achieve sure holding of the line 1 or of the thermal conductive sheet 717 the projection halves 218 can partially overlap one another, even though this is not necessary in all cases. Finally, the surface of the thermal conductive sheet exposed to the air flow is thereby also decreased somewhat. With an embodiment according to the FIGS. 1 to 4 such a close arrangement of the supports is not necessary; rather there the projections 118 can possibly be arranged in relative large spacings, which consequently increases the area of the thermal conductive sheet 717 exposed to the air flow. In any case the arrangement is such that also in the area of the pads or projections 118, 218 the cross-sectional area of the air ducts remains essentially constant to avoid air backups, and to be able to dimension the blower 133 with a relatively low power requirement and a high efficiency.

At this point it is mentioned that in the FIGS. 1 to 4 the line 1 represents a tube which accommodates a heat transporting fluid, and that in FIGS. 5 to 8 it is not shown at all, but that instead of a tube cables, heating wires etc. can be used in the known manner.

Figure 9:
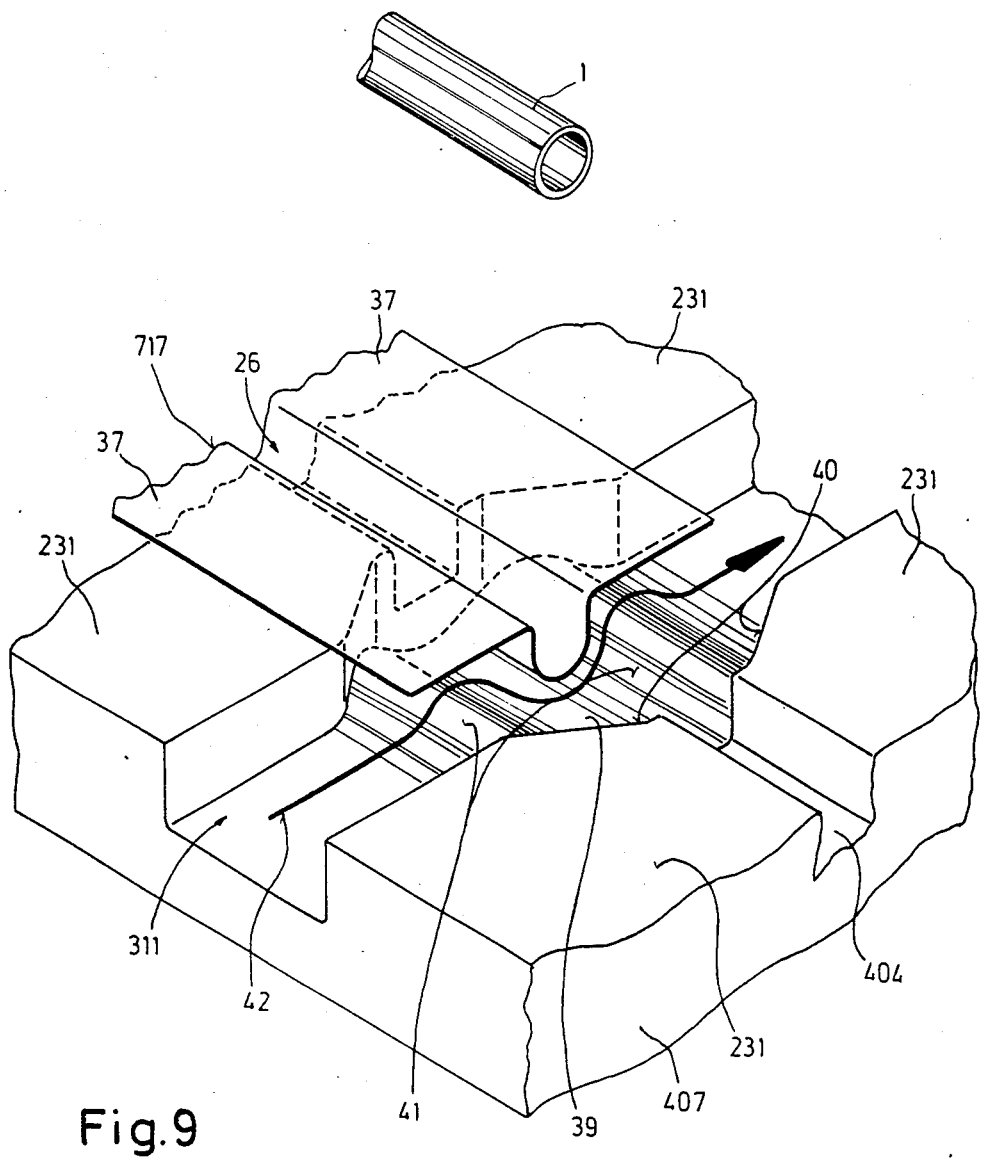

Even though the embodiments according to the figures discussed above are thermally advantageous and therefore preferred, using FIG. 9 it is demonstrated that other constructions with ducts 311 extending perpendicular to the line 1 are also conceivable. Such a duct 311 therefore collects the heat of several adjacent lines 1 and can therefore be designated a collective duct. Since with this embodiment the line 1 and the thermal conductive sheet 717 are clamped between projections 231, allowing emission of the heat only via the wings 37, the cross-ventilation shown is generally not used over the entire surface of a room closure, but preferably in the area of the edges of this closure, or in the area of the discharges of the air ducts 12 (cf. FIGS. 1 to 8) into the room, which are then advantageously connected in a manner not shown with the collective duct 311.

It can be seen that in the case of a perpendicularly extending collective duct 311 the recess 26 of the thermal conductive sheet 717 produces an obstruction in the flow path. To keep this obstruction as small as possible, two measures have been implemented in the embodiment shown. On the one hand the insulating plate 407 has a trough-like groove 39 lying in a common symmetry plane with the groove accommodating the line 1, said recess allowing the air to flow around the recess 26 of the thermal conductive sheet 717. The recess 39 naturally weakens the insulating effect of the insulating plate 407, which in the case of a low depth of this trough 39 is not especially troublesome. However, to keep it as shallow as possible, alternatively or additionally in the area of the intersection of the line 1 the collective duct 311 can be widened 40. It was surprisingly established as favorable for the trough 39 to be limited by two light floor corrugations 41. In this manner, together with simultaneous fanning out of the air flow to the side (corresponding in the widening 40), a path of flow as shown by the arrow 42 is obtained.

Figure 10:
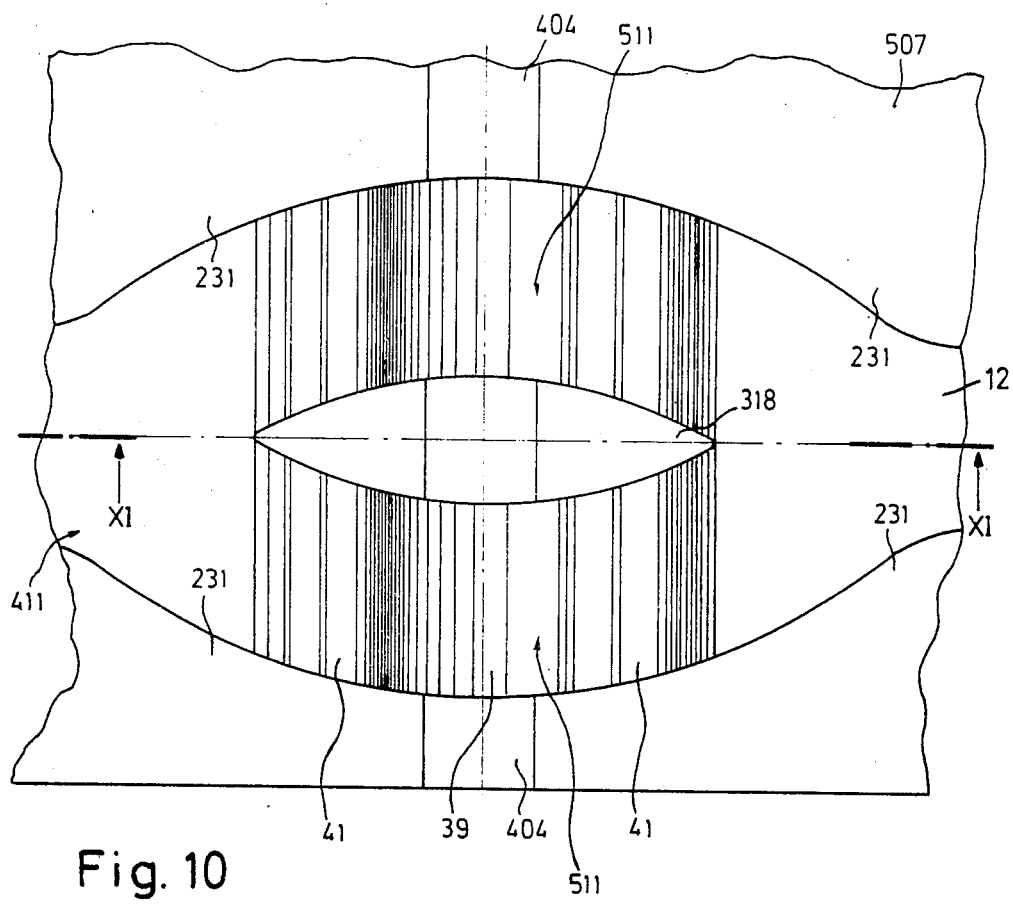
Figure 11:
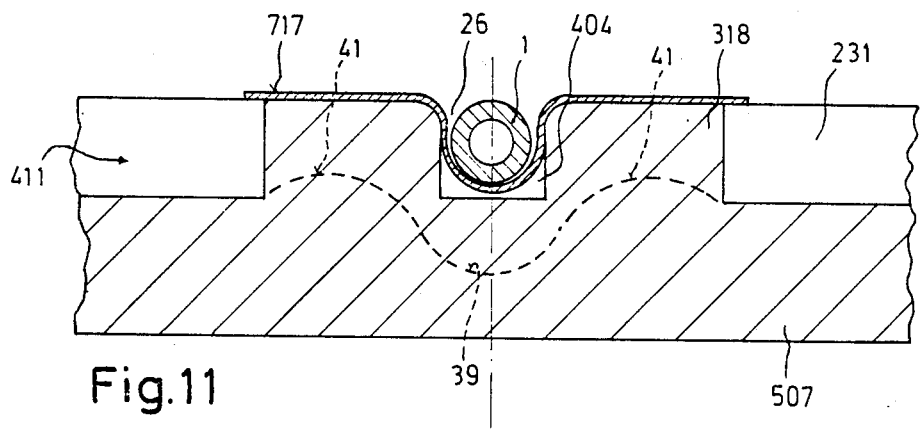

FIGS. 10 and 11 illustrate a modification for an embodiment according to FIG. 9, where within a collective duct 411 a support is foreseen in the form of a streamlined projection 318. The groove 404 thereby passes through not only the projections 231, but also the pad projection 318; in general however this is not definitely necessary to give the line 1 sure support. Such a construction is rather likely to be used where after passing through the pad projection 318 the groove 404 does not continue (in a straight line) on the opposite side, but connects to a bend of the line which connects two parallel line sections.

Here, the problem of providing for obstruction-free air flow in the collective duct 411 is again encountered, which is solved on the one hand by the trough 39, and on the other hand by the collective duct 411 branching at the pad projection 318, in which case both duct branches 511 can have e.g. the same width as the collective duct 411 in its further continuation to increase the cross-sectional area of the duct 411. As clearly shown in FIG. 11, where the corrugations 41 and the trough 39 are insinuated by a dash-dot line, after insertion of the thermal conductive sheet 717 with its recess 26 the cross-sectional area of the collective duct 411 becomes essentially constant, namely also in the areas of its branches 511 bypassing the pad projection 318.

Not all buildings have the necessary space for the installation of a tempering system, especially a floor heating system. It is consequentlyed occasionally the objective to save structural height in order to be able to install such a system in such buildings or rooms after all. Even if the embodiment according to the present invention already affords an extremely low structural height comprising practically only the height of the line 1 itself as shown in FIGS. 3, 4, 7, 8, 9 and 11, FIG. 12 illustrates how the structural height can be reduced even further.

For this purpose a relatively shallow trough 42 accommodating part of the recess 26 of the thermal conductive sheet 717 is foreseen in the insulating plate. For the one part the weakening of the insulation effect of the plate 607 is low, for the other part it is especially negligible when the adjoining room must also be tempered in any case and the heat lost to one room is gained by the other.

It must however be noted that the decrease in structural height sacrifices cross-sectional area of the air ducts 12, for which reason they are preferably widened or the projections 131 are narrowed. It is possible that — in the very case of floor heating systems — this will lead to decreased walking strength, which can be compensated by reinforcing the thermal conductive sheet 717 correspondingly. This reinforcement can be effected either simply by a greater material thickness, or by using stiffening ribs as is described below using FIG. 13. The reinforcement with ribs (in spite of possibly higher manufacturing costs) is to be preferred insofar as this simultaneously results in a further increase in the heat emission surfaces of the thermal conductive sheet.

Figure 12:
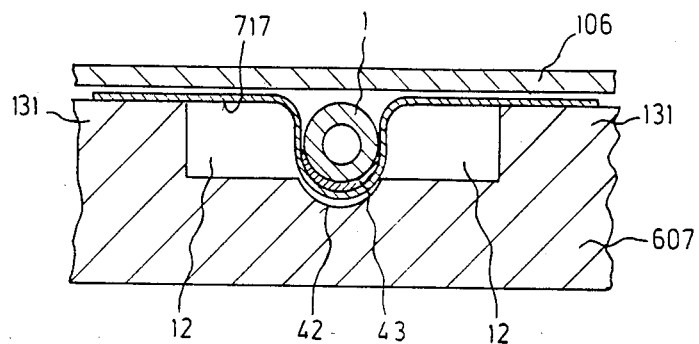

One problem with the embodiment incorporating a reduced structural height according to FIG. 12 might be seen in that just at that point at which the insulating effect of the plate 607 is reduced, the passage of the heat of the line 1 or of the thermal conductive plate 717 which envelopes or contacts it to the air ducts 12 is poorest, and a heat accumulation will therefore occur at this point.

Therefore, to improve the removal of the heat, at least in the area between the line 1 and the thermal conductive sheet 717 opposite the trough 42 a thermally conductive compound 43 (e.g. enamel) is foreseen which provides a good thermally conductive connection between the parts 1 and 717, thereby avoiding heat accumulations in the area of the trough 42. The gap area provided with the thermally conductive enamel 43 extends at least somewhat farther than would correspond to the dimensions of the trough, and such a compound 43 can also be foreseen e.g. in the case of FIG. 4 insofar as the condensate water channels formed by the beads 38 are not needed, e.g. when a thermal conductive sheet with such beads 38 is used for a heating system.

It was already mentioned that the cross-sectional shape of the line is unessential for the invention. Hence, if say a line 101 of square cross-section is used, the recess 126 of the thermal conductive sheet 817 has a corresponding cross-sectional shape.

To further reduce the structural height of the system a flat rectangular cross section can also be used for the line, but it is noted that in this case although a relatively large rectangular surface is available for the emission of heat to the outer layer 106 (not shown in FIG. 13), an equally large rectangular surface faces the insulating plate 607. To avoid heat accumulations at this point, a thermally conductive enamel should be foreseen in the gap between the thermal conductive sheet and the line, and/or a gap is foreseen between the thermal conductive sheet 817 with its recess 126 and the insulating plate 607. This can be accomplished e.g. by short ribs separating the bottom 44 of the recess 126 from the insulating plate aid ribs serving not only as spacers, but also as heat emission surfaces. In the case of a cooling system the space remaining free under the bottom 44 of the recess 126 can also be used to remove the condensate water. It can however not be overlooked that by virtue of this spacing at least of part of the structural height is lost. Another possibility of creating a channel for removing the heat from the bottom 44 of the recess 126 would be the provision of a longitudinal trough in the insulating plate 607 which is covered by the edge 44. If desired, from this longitudinal trough a connection can thereby also be made to the air ducts 12, such that the trough extends serpentine-like over the length of the hollow space 304.

Figure 13:
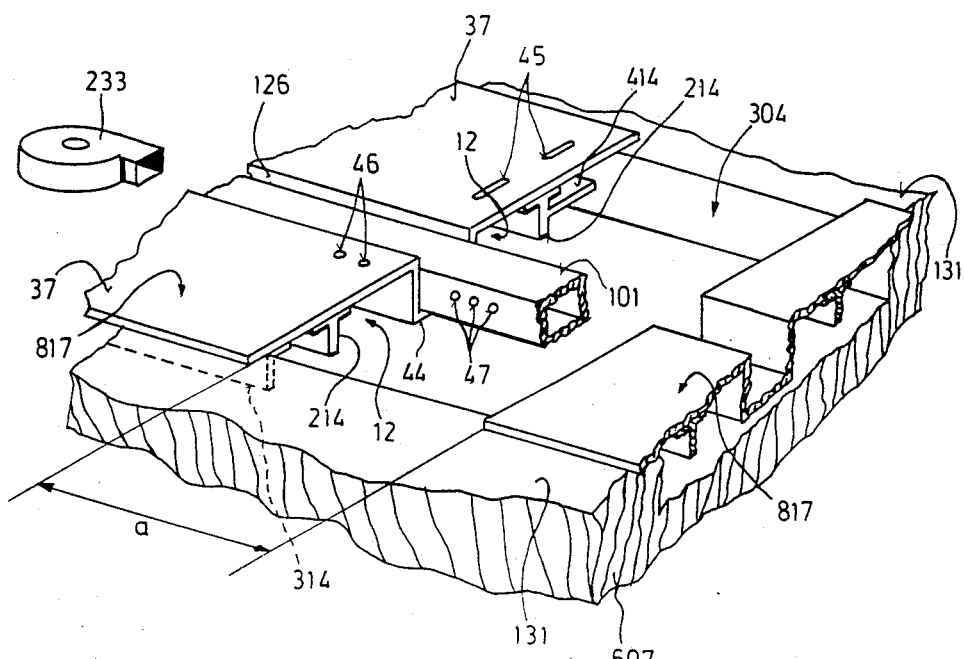

In the case shown in FIG. 13 the hollow space 304 is made relatively wide, and it has already been mentioned above that in such a case ribs 214 perpendicular to the plane of the insulating plate 607 or diagonally in the shape of formwork can be foreseen to increase the strength or walking strength. These ribs also serve to enlarge the heat emitting surface and can be e.g. T-shaped or double T-shaped. In the former case they are expediently welded to the thermal conductive sheet 817.

In the second case it may suffice to merely place them on the floor of the hollow space 304 and to cover them with the thermal conductive sheet.

To secure the thermal conductive sheet 817 in its lateral position between the air ducts 12 and inside the hollow space 304 it is not necessary to foresee pad projections as in the embodiments described above which due to their insulating effect impair the heat transfer. Rather, e.g. an L-shaped rib 314 can be arranged at every or only at one edge of the thermal conductive sheet 817, and/or a transverse rib 414 can extend from a T-rib 214 to the wall of the neighboring projection 131. In any case instead of an insulation as with the pads 118, 218 a remarkable enlargement of the heat emitting surface is thereby obtained, so that here the designation "subsurface convector" is especially appropriate. The number of ribs 214 is naturally optional.

A further measure to enlarge the surface of the thermal conductive sheet 817 can consist in the construction of relatively short, bead-shaped transverse ribs 45 which can also extend in longitudinal direction of the hollow space 304, which however by their (preferred) transverse direction contribute rather to the strength of the thermal conductive sheet. Instead of transverse ribs 45 pad-like depressions 46 can be distributed over the entire surface of the wings 37 of the thermal conductive sheet (only two are shown).

According to FIG. 13 the line 101 is connected to a blower 233 as well as to a heat exchanger of known type which is not shown for the passage of air as a heat transport medium. It is on the one hand expedient for this heated air to be blown directly into the room to be heated so that losses are not incurred by the very heat transmission; on the other hand it is not always expedient to install several line tubes open at the end, thereby discharging into the room. Finally, the heat is distributed uniformly over the closure, even if air is forced through the air ducts 12 which as such would require an additional blower 133 (see FIG. 1).

Therefore, in order for a single blower to suffice and to still provide for good heat distribution, a distance a can be left free between two thermal conductive sheets 817. Within this distance at least one perforation 47 can be foreseen in the line 101 conveying the air which is configured either in the manner shown as a drilled hole, or also as a section cutout of the side wall of the line. But in particular with drilled holes the hole cross section can easily be dimensioned such that only a part of the warm discharges into an interspace with the distance a, and another is directed up to the next distance a. If such perforations 47 are foreseen, it is also especially expedient for the air ducts 12 to be connected with the room e.g. via a collective duct extending near the edge of the closure of the room. With a line 101 of square or rectangular cross section the drilling of perforations 47 through the even surface is especially facilitated, such a line having a lesser tendency on installation to twist, whereby after the drilling of the perforations 47 their direction to the respective side is definitely assured. The holes can possibly also be drilled somewhat diagonal to the direction of air flow to facilitate the outflow of heated air into the air ducts 12.

In FIG. 13A heating lines 1 insinuated by dot-dash lines (with current or a fluid as an energy medium) are installed in a box section 2. This profiled plate 2 consists of a baseplate 7 of insulating material such as polystyrol or polyurethane hard foam. The plate 7 has slots 8 in predetermined spacings, into which a metal strip 9 can be inserted. The edged ends of profiled thermal conductive sheets 17 can be inserted into grooves 10 of these metal strips 9, which in a recess 26 accommodate a heating line 1. Heat is thereby directly transferred from the heating line 1 to the thermal conductive sheet 17, from which the heat goes to one of the ducts 12 formed between thermal conductive plate 17 and baseplate 7, and from there discharged via the circulated air into the room to be heated.

By this arrangement not only a space-saving and thermally efficient design is created. But a covering by means of an overlying plate can possibly also be foregone which up to this point was required on the one hand for better distribution and radiation of the heat into the room, and on the other hand for improved distribution of floor loading with floor heating systems since the box section shown can be of a sufficiently stiff and self-supporting construction. In case an additional stiffening is required, T-shaped supporting strips 114 can be installed in further slots 112 in the baseplate 7 which can possibly be fitted with stiffening ribs 127 to improve their own supporting action and to limit their penetration depth into the slots 112.

To facilitate the installation of the box section 2 it can be desirable to make the baseplate 7 not out of a single piece, but out of strips of a width of about that of the thermal conductive sheets 17, which then together form panel-like plates 2. These strips can be connected e.g. with dowels between the baseplate strips.

As a supplement to the box sections 2, according to a preferred embodiment of the invention a prefabricated plate 3, 3a or 3b can be foreseen, which i.a. is to accommodate the bends 1a of the heating line 1. For purposes of clarity the floor heating system is shown exploded in FIG. 13A, but in practice the plates 3, 3a or 3b are naturally installed in contact with the profiles 2.

Every plate 3 has at least one groove 4 or 4a to accommodate the bend 1a of the heating line 1. This groove 4 or 4a takes over the convection air to or for adjacent ducts in which the heating line sections connected to one another are installed, and serves these two ducts as a collective duct. As can be seen in the comparison of the grooves 4 or 4a they can have any given cross-sectional form, i.e. round like the groove 4, or trough-shaped with a further groove 4a extending on the inside to accommodate the bend 1a. Square or rectangular cross sections or V cross sections are also possible.

The grooves 4, 4a or 4b can also be made only during the installation work at those points at which the bends 1a are installed. However, the edge plates 3, 3a or 3b are preferably already made in the form shown, whereby manufacture becomes cheaper.

The grooves 4 or 4a align essentially with the recesses 26 of the box section 2. An air duct is thereby created which is also bent in the area of the bends 1a. This may be of advantage for certain constructions; the respective groove 4 or 4a can especially even serve as a guide for making the bend 1a of the heating line 1. The bend for the convection air however constitutes a resistance to the flow, namely opposite the ducts 12, which could reduce the efficiency of the arrangement. For this reason convection grooves 5b are preferably foreseen which provide the connection to the ducts 12. In addition, to remove the heat, grooves 5, 5a can emanate say ray-like from the grooves 4 or 4a and discharge at the oppostie edge of the plates 3, 3a, 3b.

For large rooms it might be expedient to foresee two or more heating lines 1, and hence e.g. also to arrange a row of plates 3 in the middle of the room. In this case it is especially expedient for the groove 4 forseen for accommodating the bend 1a of the heating line 1 and the groove 5 foreseen for taking in or discharging the convection air to be of symmetrical construction especially at their zone of contact, so that the adjacent heating line can be installed in them. For this purpose a doubly wide space corresponding to two bends 1a in the area of the tangential discharges of the two grooves 4, 5 is foreseen in the middle of the plate 3.

If however the respective edge plate 3, 3a or 3b is installed in the edge area of the room, then the convection grooves 5 or 5a form channels about in the continuation of the recesses 26 of the thermal conductive sheets 17 through which the heated air in the space can reach the adjoining closures, e.g. through slots at the side. However, as such a single channel would suffice, which can possibly also be constructed of only one groove 5a. This groove emanates ray-like from the groove 4. Hence, the plate can be of symmetric construction.

As shown in FIG. 13B at the left of the vertical middle line it is not necessary for a heating line to be installed in each of the grooves 4. Several of these grooves or also only one groove can remain empty. The bends of the grooves 4 can also be of U-shape with parallel legs. Further, a through groove 11 extending transversely to the grooves 4 and/or to the grooves 5 over the plate 3, 3a, 3b can be foreseen as a collective duct which possibly accommodates the supplying heating line 1 to the otherwise serpentine-installed floor surface. However, the groove 11 can preferably remain free. The same naturally applies analogously for the embodiments such as are shown in FIG. 13A. The free groove 11 forms a further collective duct, through which the air flow from or to several grooves 4 or 4a is distributed. The groove 11 therefore homogenizes the temperature distribution from several bend zones 1a. If desired to facilitate working, instead of a single-piece plate 3b the plate can be in two pieces as is shown to the right of the middle line of plates 103, 203 in FIG. 13B. In this case in the transition range the ducts in the plate 203 should be wide enough that the convection flow is not disrupted even with installation tolerances.

After the installation of the plates 2 and 3, 3a or 3b and the insertion of the heating lines 1 a usual cover of thermally conductive material, e.g. in the form of an aluminium plate 6, or of a heat-retaining material, e.g. in the form of a prefabricated concrete slab, can be applied. However, this can also be omitted because of the self-supporting design of the profiles 2. If desired, in particular the convection ducts 4, 5 can also be covered by heat-retaining plates 6, on which the floor covering (not shown) is directly laid, whereby the concreting shut of these grooves is avoided with surety.

Moreover, if necessary the grooves, as also seen from the description below, can also accommodate two heating lines 1 which e.g. intersect or which are adjacent to or on top of one another over a short section, especially — but not exclusively — where the heating medium is supplied or removed, or if the room to be heated has an irregular floor plan or niches and the like.

As already mentioned above, on the cover 6 a plaster covering (not shown) can be applied directly to the box sections 2. At this point if desired prefabricated elements such as tile panels or the like can be installed.

Another construction according to the present invention is shown in two embodiment modifications in FIG. 13C. An insulating plate 107 has steps 31 at regular spacings, between which recesses are formed, in which box sections 602 and 702 are inserted. This arrangement is advantageous where due to lower heating intensity the heating lines are to be installed in greater intervals. The spaces between the steps 31 then have a width which just corresponds to the width of the box sections 602, 702.

Each of the two box sections 602, 702 consists of thermally conductive material, especially of aluminium, each of which accommodates on the inside a section of a heating line 1, which is to be connected via a bend 1a with the heating line section of the adjacent box section. In this way the installation of the heating system is simplified insofar as only the insulating plate 107 is installed and the panels 602, 702 must be inserted between the steps 31 (which can be done by unskilled workers), whereafter only the individual heating line sections must be connected with one another and with the heat source.

However, if the heating panels 602, 702 have not already been prefabricated, after the installation of the insulating plate 107 first the basic parts 613 or 713 of the two-piece box sections 602, 702 are installed, and then the associated section of the heating line 1 is installed. To prevent the heating lines from slipping inside the box sections the basic parts 613, 713 of the two box section profiles 602, 702 have a wavy profile which forms a recess 626, 726 accommodating the associated section of the heating line. This recess 626 or 726 can be furnished transverse to its longitudinal extension with beads or ribs (not shown) or longitudinally with a corrugation to clamp the heating line 1 after it has been installed. It is to be noted however that the respective heating line 1 thereby has a thermally conductive connection with the box section 602 or 702 only via these ribs or corrugations, which can deteriorate the heat transfer.

This problem can be solved as will be expounded later using FIGS. 19 and 20, namely by the respective recesses hugging the heating line 1 slightly more than 180 degrees, yielding two advantages: on the one hand an even larger heat transfer surface is produced; on the other hand with only slightly springing or elastic construction of this recess and/or the outer wall of the heating line a clamping action is obtained which facilitates installation work.

After the heating line sections are installed in the respective basic parts 613 or 713 the respective upper parts 813 or 713 can be placed on top. In the case of the box section 602 it can be seen that a height H corresponds about to the diameter or (in the case of an angular cross section of the heating line 1) the height of the heating line 1, plus the material thicknesses of the box section 602 itself, as well as any clearance, so that the total structural height is kept low. This also results in even further improved heat transfer, and the removal of this heat is not only not obstructed, but even improved because of the relatively large cross section of the remaining convection ducts 12. To increase the carrying capacity on the one hand, and to secure the height H on the other, inside the box section 602 supporting webs 14 can be welded on or formed along with the section when it is rolled. It can be seen that one of the webs 14 is connected with the basic or upper part 613 or 813, but both (or several) can also be connected respectively with one of the two parts 613 or 813 as will be seen at a later point in the description.

To secure the upper part 813 on the basic part 613 the latter is fitted on its longer narrow side with a nose 129, over which the bordered edge 229 of the upper part is pulled by its springing open and catching behind the nose. If for any reasons it is desirable to easily open the box section 602 at a later time, instead of the nose 129 a row of wart-like projections can also be forseen along the narrow side of the box section 602, over which the bordered edge 229 can be pulled more easily in both directions.

In the case of the box section 602 the upper and the basic part 613 and 813 are of different construction. For reasons of stocking and manufacturing large series it can however be expedient to foresee similar parts. This is realized in the box section 702, which consists of similarly formed parts 713. An additional, surprising advantage is realized in that the similar construction of the two basic parts 713 of the box section necessitates a recess 726 also being foreseen in both parts 713 which envelopes the heating line 1. The surface effecting the heat transfer from the heating line to the box section 702 is thereby enlarged even further, resulting in an energetic advantage. In such a case it is easier to come back to the aforementioned beads, ribs or corrugations to achieve a clamping effect for the heating line 1.

In the area of the heating line bends 1a a special plate 303 is arranged in front of the insulating plate 107. This plate has a collective duct 111 which is to take over the heated air from the ducts 12. However, due to the facts that the height H of the box sections 602, 702 correspond about to the thickness of the heating line 1, and the plate 303 has a base 32 of the same height, so that the height of the collective duct 111 corresponds to only about that of the heating line 1, under circumstances the flow from the ducts 12 or through the collective duct 111 can be obstructed, which can cause undesirable heat accumulations. To overcome this problem two extensions of the collective duct 111 are shown by FIG. 13C for facilitating the flow of the heated air (or of the air flowing into the ducts 12).

Opposite the box section 602 convection grooves 105 are foreseen in the continuation of the ducts 12 inside the collective duct which are preferably connected by at least one tansverse groove 211 possibly extending along the entire collective duct 111. As already explained using FIGS. 13A and 13B the grooves 105 and 211 can have any given cross section, e.g. square, rectangular, triangular or trapezoidal, the last mentioned forms being of greater advantages because they facilitate forming the plate 303 consisting of polystyrol or polyurethane hard foam, possibly also of concrete, expanded clay or the like. If desired, here as well the plate 303 can consist of two pieces, of which the one part is formed essentially alone by the base 32. Through the grooves 105 and 211 the convection air can then bypass the heating line bends 1a themselves if a cover plate 6 as shown in FIG. 13A is to be placed over the collective duct 211.

In most cases the tempering system according to the present invention will be a space heating system, even though in this manner cooling is also conceivable. But while for cooling an arrangement of grooves 105, 211 below the level of the box section is expedient because the cooled air flows along the lower level in any case, for the heated air it is of greater advantages to provide for a flow path upward or on the upper side. This can be done simply by the collective duct 111 being covered by a grating, through the openings of which the warm air enters the room. Such a solution is possible in any case, regardless of whether the tempering system is foreseen for the floor, a vertical wall or for the ceiling. However, for floors a grating box 122 can also be foreseen which has on at least one of its surfaces a ventilation grating 120 or louvers, and the inside of which is preferably utilized for accommodating a cross-flow blower, the rotor 33 of which is insinuated in FIG. 13C only schematically.

Another solution is illustrated in the collective duct 111 opposite the box section 702. In said duct is foreseen a surface 403 inclined downwards toward the base 32 which thereby increases the cross section of the collective duct. Depending on the use of the tempering system according to the present invention for cooling purposes a duct space of essentially triangular cross section can therefore remain beneath the bend 1a of the heating or cooling line, or for heating purposes the bend 1a of the heating line 1 can be bent downward in the manner shown (dash-dot line) far enough that an overlying free space is created for the convection air.

The plates 3, 3a, 3b, 103, 203 or 303 will frequently be arranged on the edge of a surface to be heated as edge plates. If the arrangement should be such that the opening of the convection ducts toward the room is foreseen from say a wall perpendicular to the floor which therefore houses a convection shaft, it will be necessary to interrupt the base 32 by a cut-out 34, thereby creating a connection between the collective duct 111 and the convection shaft. However, with a newly planned house the arrangement can be planned such that immediately under the convection shaft a slot opening remains in the masonry, into which the finish-assembled heating line bends are inserted. In this case a collective duct is to be foreseen in the masonry, from which one or more convection shafts or other openings ducts leading to openings in the room branch off.

As also shown in FIG. 14 each of the box sections 102 is not of single piece construction, but consists of a basic part 13 with web plates 14 arranged perpendicular thereto. The side limitation walls 15 or 16 of each basic part 13 are preferably fitted with a meshing profile, so that on installation firm adherence is assured. Thermal conductive sheets 17 rest on the basic parts 13, and the heating line 1 is inserted in the recesses of said sheets. The recesses 26 of the thermal conductive sheets 17 are preferably to be dimensioned such that the respective heating line 1 is clamped therein with a fitting seat, whereby it cannot be shifted.

According to the embodiment shown in FIG. 13A a cover plate 6 can also be foreseen here (insinuated by dash-dot line). If in such a case the collective duct 111 would not be foreseen, the heating line bends 1a, for which pads or half-pads 18 forming guides in space 104 can be foreseen, constitute a flow obstacle. Conversely, the convection air can flow unobstructed through the collective duct 111, which is expanded perpendicular to the plane of the heating line bend 1a, according to the arrows 19 pointing downwards.

Since the plate constructions 102 themselves preferably consist of metal, thereby providing for uniform heat distribution, and also form a base for a wall, ceiling or floor covering, the plate 6 can be omitted or the plaster immediately apply, whereby not only material but also space is saved, additionally achieving a reduction in costs. In this case it is advantageous for the space 104 and a possibly (especially with a prefabricated plate 103) foreseen duct 111 to be provided with a covering 22 which forms a collective duct 211 extending above the plane of the heating line bends 1a and has e.g. at least one of the illustrated ventilation gratings 20 or 21. This solution is insofar advantageous in that the heated air discharging from the ducts 12 can rise as shown by the arrows pointing upwards 23 in the direction of its natural flow. However the solution shown in FIG. 14 is to be regarded as only an example, because the collective duct 211 located above the bends 1a can also extend inside a closure of the room and e.g. vertically, in which case a corresponding ventilation grating can also be arranged vertically in the wall.

The plate constructions 102 can naturally also consist of other metals than light metals. Hence, say galvanized steel sheet is possible, but the use of light metals unites the advantages of low weight, high thermal conductivity and high stiffness and carrying capacity. In view of the higher temperatures resistance to corrosion is also emphasized as an advantage of light-metal plates. However, at this point it is noted that the design shown is by no means limited to heating systems, because it can easily be comprehended that when tubes 1 are used a cooling medium can be sent through them instead of a heating medium. In the latter case it will however be expedient to install the tubes 1 either in the ceiling of the room to be tempered, from where the cool air can descend, or — say in the cover 22 or in a corresponding collective duct in the wall — to install a blower to supply the cool air from below to the room.

It has already been mentioned with reference to FIGS. 13A and 13B that the edge plates 3, 3a or 3b need not necessarily be installed at the edge of a room, say when each of two heating line systems covers a part of the room to be tempered, so that e.g. in the middle heating line bends are to be arranged and preferably edge plates foreseen. A collective duct 111 can also be arranged in the middle of the area to be tempered. The dimensions of this collective duct can be matched to meet the respective requirements, all the more because it is not definitely necessary to support the heating line bends 1a in the area of the space 104 by the base of the plate 103 shown in FIG. 14.

Reference has already been made to the advantages of the plate construction 102. An especially simple construction can be seen referring to the plate construction 202 in FIG. 15. The accommodation of heating lines in metallic supports is, to be sure, already known, but the height of the preceding designs is several times that of the heating line, resulting in a high spatial requirement. The installation of the heating line has often also required a lot of effort because for the heating line only bores had been foreseen, through which it first had to be pulled. For this purpose a certain clearance between the clear bore cross section and the heating line diameter was naturally necessary, which certainly did not favor the heat transfer. In addition, either an even upper or and even lower surface was lacking. Conversely, with the plate constructions 102 to 502 according to FIGS. 14 to 18 it is if desired quite possible to arrange them one above the other without obstruction their function. The basic part 113 of the plate construction 202 according to FIG. 15 can be obtain simply by bending or deep drawing a plate. In this basic part 113 a thermal conductive sheet 17 can then be installed, the lateral position of which (if for this purpose side walls of the basic part 113 are not foreseen) can also be secured as in FIG. 14 by bordered side edges 24. Over at least a part of its surface the thermal conductive sheet 17 can be furnished with corrugations or beads in longitudinal or transverse direction, for the one part to improve the heat emission, for the other part — as shown with the transverse ribs 25 in the area of the recess accommodating the heating line 1 — to fix the heating line correspondingly by clamping. The plate construction 302 according to FIG. 16 is built up in the form of a box of two basic parts 213, 313 which can be held together by a snap connection not shown. In addition to the thermal conductive sheet 17 the box-like construction can contain a further such sheet 117. In any case, the gaps shown in the FIGS. 15 to 18 may not conceal the fact that all metal parts are close together to achieve good heat transfer. For improved support of the heating line 1, which here is located about in the middle of the box-like plate construction 302, an additional support 27 can be foreseen which can consist either of a correspondingly cut and welded-on transverse plate, or of a correspondingly profiled, bent metal strip. However, the edge 24 of the thermal conductive sheet 17 can also be bent to form a rectangle (viewed in the cross section), so that it extends not only downward, but also along a section of the floor of the basic part 213 and upwards again, thereby supporting its own upper side with its edge end.

FIG. 17 shows a plate construction 402 which is divided into two parts by a horizontal middle line 28, in each of which a heating line can be arranged one on top of the other. If this possibility is exploited, a thermal conductive sheet 217 is to be used, the steps of which seen in FIG. 17 leaves the required space in the upper part of the sheet construction 402 to accommodate a second heating line. Otherwise a thermal conductive sheet 317 can be used (left side of FIG. 17). Similar to the basic part 13 of FIG. 14 the part 413 of FIG. 17 has vertical webs 14 to support the thermal conductive sheet 217 or 317. In contrast to FIG. 14 it is advantageous according to FIG. 17 for the outside dimensions of the respective thermal conductive sheet 217 or 317 to be such that the side edges 24 are inside the basic part.

The plate construction 502 as shown in FIG. 18 is similar, said construction namely also being capable of accommodating a second heating line 1 above the middle line 28. In this case the thermal conductive sheet 417 according to the right side of FIG. 18 is to be selected; otherwise the left thermal conductive sheet 517 can be used. For covering the box-like plate construction 502 a cover part 613 is foreseen, the side edges of which are slightly springing and furnished with a bead 29 corresponding to the side walls 15 or 16 (see FIG. 14) to form a snap connection.

In FIG. 19 the thermal conductive sheet 317 (see left side in FIG. 17) is shown magnified. In the area of a collective duct 111 or 211 it can be advantageous to foresee edgings 30 at the end of such a thermal conductive sheet 317 to deflect the air flow. These edgings are bent downwards if the air is to be supplied to a collective duct 111 located at a lower position (see FIG. 14); conversely, for the collective duct 211 the edgings 30 can point upwards. It is also noted here again that the thermal conductive sheet according to FIG. 19 is shown with smooth surfaces, but that if desired it is furnished with ribs, beads or corrugations on at least one of its surfaces. In the construction shown however, good clamping of the heating line and good heat transfer are achieved simply by the recess 26 providing a slightly springing enclosure over the heating line (not shown) by more than 180 degrees. The thermal conductive sheet does not need to run through the entire plate construction, but rather short, prefabricated sections can be arranged in intervals. Even though due to the larger surface a sheet is preferred, the fixation of the heating line 1 can also possibly be effected with correspondingly shaped wire clips.

In the scope of the invention a large number of modifications are possible; for example in place of an edge plate 103 the corresponding profile can be hammered or milled in the floor. In addition, the box-like plate constructions and/or the thermal conductive sheet can be affixed by glueing, e.g. with a two-component cement. In this case it might be expedient to foresee in the area of the respective side wall 15 or 16 a neighboring parallel wall, at least as a U-shaped branching in the upper area, in which case the side edges 24 or the corresponding edges of the matching basic part is inserted between both walls and glued to them. In addition, the plate constructions, e.g. the lower basic part thereof, can be made of a non-metallic material to insulate the heat downward, while the metal part is foreseen on the upper side. The web plates 14 can possibly be separate installable metal parts to provide the heat transfer to the ducts at the sides 12.

Moreover, it is by no means necessary to construct the box sections to accommodate heating lines only at one point. FIG. 20 shows that a single box section 802 can also be constructed to accommodate two heating lines 1 next to one another, in which case the lower part 813 similar to the cross section shown in FIG. 15 has a meandering shape, which lends itself to manufacture. About in the middle the lower part 813 has a relatively narrow slot 36, shown here excessively wide in relation to the other dimensions for purposes of clarity, into which a bead 35 of the thermal conductive sheet 617 can be inserted. For improved fixation of the thermal conductive sheet 617 the slot 36 might be expanded downward and also the bead widened somewhat at its free end, so that it fits into the slot 36 with a snap seating. The recesses 26 of the thermal conductive sheet 617 are also configured such that they enclose the respective heating line 1 with springing action more than 180 degrees. The height H of the box section 802 corresponds in turn nearly to the cross sectional height of the heating line 1, although in FIGS. 15 to 18 and 20 only for purposes of clarity distinct air gaps are exaggeratingly drawn between the lines corresponding to the basic part and the thermal conductive sheet.

Further possible modifications can foresee that the box section comprises two laterally telescoping parts instead of a lower and an upper part.

What I claim is:

1. In an installation for tempering a room of a building, a wall defining said room and comprising an outer layer facing said room, an inner layer looking away from said room, an interspace between said inner and outer layers, elongated tempering means within said interspace, spacing wall means disposed between the inner and outer layers on opposite sides of the tempering means, thermal conductive sheet means extending between said spacing wall means to be supported by said inner layer in thermal conductive connection with said outer layer, thereby bridging said interspace and defining, at least in part, a conduit for conveying air at one side of said interspace which faces said inner layer, said sheet means including a first surface section being in thermal conductive connection with said tempering means, and a second surface section exposed to the air conveyed within said conduit, said second surface section having a surface area at least twice the surface area of said first surface section.

2. An installation as claimed in claim 1, wherein said sheet means comprise means defining a box section of substantially rectangular cross section defining at least partly said conduit and receiving said elongated tempering means, the larger dimension of said box section rectangular in cross section being parallel to said inner and outer layers.

3. An installation as claimed in claim 2, wherein said means defining a box section are composed of at least two separate parts.

4. An installation as claimed in claim 3, wherein said box section comprises an inner part to be arranged adjacent said inner layer, and an outer part to be arranged adjacent said outer layer, said inner and outer parts being joined together.

5. An installation as claimed in claim 2, further comprising positive connection means on said means defining a box section.

6. An installation as claimed in claim 1, wherein said interspace comprises first channel means at least partly defined by said sheet means and housing said elongated tempering means, and second channel means conveying air and being thermal conductive connection with said sheet means.

7. An installation as claimed in claim 6, wherein said second channel means extend across said elongated tempering means and have a larger cross-sectional area than the latters.

8. An installation as claimed in claim 7, wherein said elongated tempering means are bent back within said second channel means.

9. An installation as claimed in claim 1, wherein said interspace has at least one orifice within said building for air circulation.

10. An installation as claimed in claim 1, wherein said means forming an interspace comprise means defining a groove for receiving and holding said elongated tempering means.

11. An installation as claimed in claim 1, wherein the distance between the inner and the outer layer is essentially equal to or only slightly deviating from the transverse dimension of the tempering means measured in the direction of the wall thickness.

* * * * *